United States Patent
Jentoft

(10) Patent No.: US 9,495,845 B1
(45) Date of Patent: Nov. 15, 2016

(54) CONTROL PANEL FOR SECURITY MONITORING SYSTEM PROVIDING CELL-SYSTEM UPGRADES

(71) Applicant: RSI Video Technologies, Inc., White Bear Lake, MN (US)

(72) Inventor: Keith Jentoft, Circle Pines, MN (US)

(73) Assignee: RSI Video Technologies, Inc., Vadnais Heights, MN (US)

( * ) Notice: Subject to any disclaimer, the term of this patent is extended or adjusted under 35 U.S.C. 154(b) by 386 days.

(21) Appl. No.: 14/044,224

(22) Filed: Oct. 2, 2013

Related U.S. Application Data

(60) Provisional application No. 61/708,956, filed on Oct. 2, 2012.

(51) Int. Cl.
*H04N 7/18* (2006.01)
*G08B 1/08* (2006.01)

(52) U.S. Cl.
CPC . *G08B 1/08* (2013.01); *H04N 7/18* (2013.01)

(58) Field of Classification Search
None
See application file for complete search history.

(56) References Cited

U.S. PATENT DOCUMENTS

| | | |
|---|---|---|
| 3,634,846 A | 1/1972 | Fogiel |
| 4,772,875 A | 9/1988 | Maddox et al. |
| 4,857,912 A | 8/1989 | Everett, Jr. et al. |
| 4,882,567 A | 11/1989 | Johnson |
| 5,026,990 A | 6/1991 | Marman et al. |
| 5,155,474 A | 10/1992 | Park et al. |
| 5,202,661 A | 4/1993 | Everett et al. |
| 5,237,330 A | 8/1993 | Yaacov et al. |
| 5,299,971 A | 4/1994 | Hart |
| 5,448,290 A | 9/1995 | VanZeeland |
| 5,473,368 A | 12/1995 | Hart |
| 5,515,029 A | 5/1996 | Zhevelev et al. |
| 5,661,471 A | 8/1997 | Kotlicki |
| 5,693,943 A | 12/1997 | Tchernihovski et al. |
| 5,703,368 A | 12/1997 | Tomooka et al. |
| 5,790,040 A | 8/1998 | Kreier et al. |

(Continued)

FOREIGN PATENT DOCUMENTS

| | | |
|---|---|---|
| DE | 4423947 A1 | 1/1996 |
| EP | 0986038 | 3/2000 |

(Continued)

OTHER PUBLICATIONS

"Indoor Motion Viewer DCV601" Datasheet [online]. RSI Video Technologies, Feb. 22, 2013, http://www.videofied.com.au/pdf/2013/Installation%20sheets%202013/DCV701%20Indoor%20Motionviewer%20install%20sheet.pdf pp. 1-4.

(Continued)

*Primary Examiner* — Andy Rao
*Assistant Examiner* — Tyler Edwards
(74) *Attorney, Agent, or Firm* — Crawford Maunu PLLC

(57) ABSTRACT

Various aspects of the present disclosure are directed towards alarm systems, apparatus, and methods of using the systems and apparatus. In one embodiment, an alarm system includes intrusion sensor(s) and a central control panel that allows limited access to changes to a system configuration based upon the use of an installer code and the system configuration includes adding or changing interface modules. Additionally, the system includes an authorization circuit that requests the installer code from the remote location over a communications link and in response thereto, provides the installer code to the control circuit.

16 Claims, 4 Drawing Sheets

(56) References Cited

U.S. PATENT DOCUMENTS

| | | |
|---|---|---|
| 5,819,124 A | 10/1998 | Somner et al. |
| 5,832,671 A | 11/1998 | White |
| 5,850,180 A | 12/1998 | Hess |
| 5,936,524 A | 8/1999 | Zhevelev et al. |
| 6,037,902 A | 3/2000 | Pinhas et al. |
| 6,188,715 B1 | 2/2001 | Partyka |
| 6,211,522 B1 | 4/2001 | Kotlicki et al. |
| 6,271,752 B1 | 8/2001 | Vaios |
| 6,292,508 B1 | 9/2001 | Hong et al. |
| 6,411,209 B1 | 6/2002 | Lyons et al. |
| 6,476,858 B1 | 11/2002 | Ramirez Diaz et al. |
| 6,504,479 B1 * | 1/2003 | Lemons ............ G07C 9/00087 340/430 |
| 6,636,738 B1 | 10/2003 | Hayashi |
| 6,686,952 B1 | 2/2004 | Brazier |
| 6,690,414 B2 | 2/2004 | Lyons et al. |
| 6,700,487 B2 | 3/2004 | Lyons et al. |
| 6,759,957 B2 | 7/2004 | Murakami et al. |
| 6,768,294 B1 | 7/2004 | Moldavsky et al. |
| 6,768,868 B1 | 7/2004 | Schnell |
| 6,818,881 B1 | 11/2004 | Chernichovski et al. |
| 6,819,239 B2 | 11/2004 | Bingham |
| 6,940,405 B2 | 9/2005 | Script et al. |
| 6,965,313 B1 * | 11/2005 | Saylor ................. G08B 25/016 340/5.33 |
| 6,970,183 B1 * | 11/2005 | Monroe ................ G08B 7/062 348/143 |
| 7,079,028 B2 | 7/2006 | Herrmann et al. |
| 7,081,817 B2 | 7/2006 | Zhevelev et al. |
| 7,106,193 B2 | 9/2006 | Kovach |
| 7,149,422 B2 | 12/2006 | Schnell |
| 7,151,945 B2 | 12/2006 | Myles et al. |
| 7,463,145 B2 | 12/2008 | Jentoft |
| 7,463,146 B2 | 12/2008 | Reibel et al. |
| 7,471,334 B1 | 12/2008 | Stenger |
| 7,619,512 B2 | 11/2009 | Trundle et al. |
| 7,835,343 B1 | 11/2010 | Reibel |
| 8,081,073 B2 | 12/2011 | Reibel et al. |
| 8,155,105 B2 | 4/2012 | Reibel et al. |
| 8,248,226 B2 | 8/2012 | Friar |
| 8,259,816 B2 | 9/2012 | Coleman, Sr. |
| 8,520,068 B2 | 8/2013 | Naidoo et al. |
| 2001/0028798 A1 | 10/2001 | Manowitz et al. |
| 2002/0159770 A1 | 10/2002 | Moultrie |
| 2002/0171557 A1 | 11/2002 | Wegener |
| 2003/0065407 A1 | 4/2003 | Johnson et al. |
| 2003/0128130 A1 | 7/2003 | Kao |
| 2003/0193563 A1 | 10/2003 | Suzuki |
| 2003/0202117 A1 | 10/2003 | Garner |
| 2004/0086088 A1 | 5/2004 | Naidoo et al. |
| 2004/0109059 A1 | 6/2004 | Kawakita |
| 2004/0113778 A1 | 6/2004 | Script et al. |
| 2004/0155781 A1 | 8/2004 | DeOme |
| 2004/0190467 A1 | 9/2004 | Liu et al. |
| 2004/0205823 A1 | 10/2004 | Tsai |
| 2004/0205824 A1 | 10/2004 | Tsai |
| 2004/0239497 A1 | 12/2004 | Schwartzman et al. |
| 2005/0024206 A1 | 2/2005 | Samarasekera et al. |
| 2005/0073580 A1 | 4/2005 | Takeda et al. |
| 2005/0134450 A1 | 6/2005 | Kovach |
| 2005/0134454 A1 | 6/2005 | Eskildsen |
| 2005/0200494 A1 | 9/2005 | Herrmann et al. |
| 2005/0275549 A1 | 12/2005 | Barclay et al. |
| 2006/0250501 A1 | 11/2006 | Widmann et al. |
| 2007/0018106 A1 | 1/2007 | Zhevelev et al. |
| 2007/0036535 A1 | 2/2007 | Chee |
| 2008/0079561 A1 | 4/2008 | Trundle et al. |
| 2008/0259161 A1 | 10/2008 | Hellman et al. |
| 2008/0311878 A1 | 12/2008 | Martin et al. |
| 2010/0080548 A1 | 4/2010 | Peterson et al. |
| 2010/0092764 A1 | 4/2010 | Chung et al. |
| 2010/0245107 A1 * | 9/2010 | Fulker ............. G06F 17/30873 340/691.6 |
| 2010/0289644 A1 | 11/2010 | Slavin et al. |
| 2011/0183643 A1 | 7/2011 | Martin et al. |
| 2012/0086767 A1 | 4/2012 | Lau et al. |
| 2013/0148950 A1 | 6/2013 | Chang |

FOREIGN PATENT DOCUMENTS

| | | |
|---|---|---|
| EP | 1363260 | 11/2003 |
| EP | 1575009 | 9/2005 |
| GB | 2395336 A | 5/2004 |
| WO | WO8800747 | 1/1988 |
| WO | WO9725696 | 7/1997 |
| WO | WO0127763 | 4/2001 |
| WO | WO2005034060 | 4/2005 |

OTHER PUBLICATIONS

European Search Report, European Patent Application No. 15158810.0, 2 pgs. (Jul. 17, 2015).

* cited by examiner

CONTROL PANEL FOR SECURITY MONITORING SYSTEM PROVIDING CELL-SYSTEM UPGRADES

RELATED PATENT DOCUMENT

This patent document claims benefit under 35 U.S.C. §119 to U.S. Provisional Patent Application Ser. No. 61/708,956, entitled "Control Panel for Security Monitoring System Providing Cell-System Upgrades" and filed on Oct. 2, 2012, which is fully incorporated herein by reference.

BACKGROUND

A variety of applications benefit from protection of residents, employees, personal property, and the like, by using security monitoring systems within facilities, e.g., to monitor and/or sense certain conditions such as a facility-operations problem or the presence of an unwanted intruder. Many such security systems are connected to a central control unit and monitored by an operator who can alert the appropriate emergency services in the event of an unwanted intruder. Such security systems often include a combination of sensing devices and alarm devices and some also include cameras.

Security systems are often provided with wireless communication capabilities. In certain instances, a security system can wirelessly communicate with sensing devices and alarm devices. Further, a security system can additionally or alternatively also communicate wirelessly with a remote security monitoring system. Wireless communication standards are ever-changing, and increasing in speed. Due to the fast changing technology for wireless communication and other changing issues, security systems need commensurate abilities to adapt accordingly.

SUMMARY

Aspects of the present disclosure are directed towards an alarm system having an upgradable/configurable communication module for communicating data obtained by one or more intrusion sensors. The upgradable/configurable communication module of the alarm system is provided in order to adapt to the ever-changing and ever-improving technology of wireless modems.

Other aspects of the present disclosure facilitate safe and secure communication module upgrades. For example, upgrades to a cellular communication modem may be prompted by, for example, an evolution or improvement in cellular communication technology (e.g., 3G to 4G), or an improvement in cellular service to an area. In order to allow for the adaptability of the alarm system of the present disclosure, the security of the system is maintained.

In a more specific embodiment according to the present disclosure, a base controller (or circuitry) of the alarm system includes a universal adapter configured to allow for installation of one or more multiple modems. The system utilizes an install code in order to limit access to changes in the base controller. The new/upgraded modem to be installed in the system can contain an install code, which is verified by an authorization circuit contained in the base controller. These and other aspects of the present disclosure are exemplified in a number of illustrated implementations and applications, some of which are shown in the figures and characterized in the claims section that follows.

The above overview of the present disclosure is not intended to describe each illustrated embodiment or every implementation of the present disclosure. The figures and detailed description that follow more particularly exemplify these embodiments.

BRIEF DESCRIPTION OF THE DRAWINGS

The disclosure may be more completely understood in consideration of the detailed description of various embodiments of the disclosure in connection with the accompanying drawings, in which.

Figure 1:
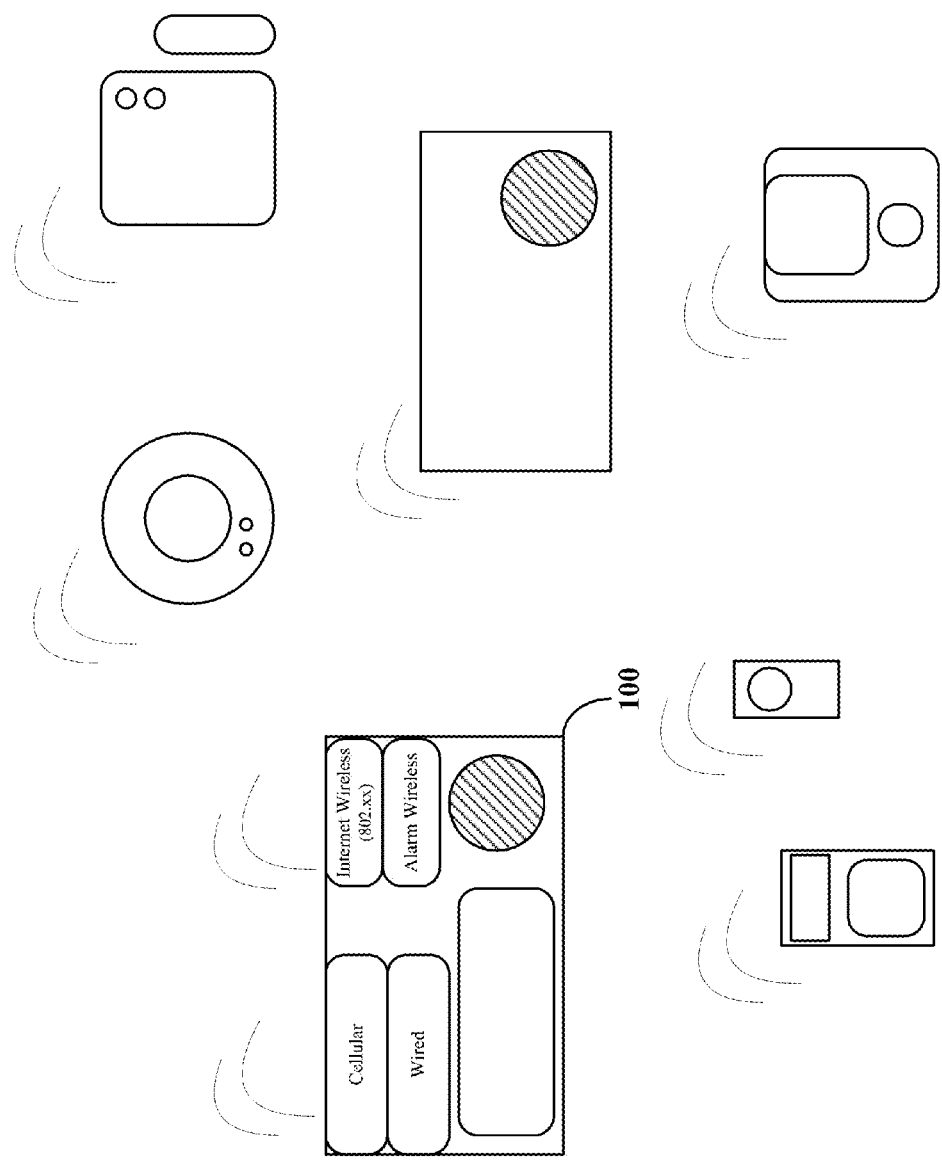
FIG. 1 shows an alarm system including various different types of wireless sensors, according to an example embodiment of the present disclosure.

While the disclosure is amenable to various modifications and alternative forms, specifics thereof have been shown by way of example in the drawings and will be described in detail. It should be understood, however, that the intention is not necessarily to limit the disclosure to the particular embodiments described. On the contrary, the intention is to cover all modifications, equivalents, and alternatives falling within the spirit and scope of the disclosure as defined by the appended claims.

DETAILED DESCRIPTION

The present disclosure is believed to be applicable to a variety of different approaches for, and arrangements used in, upgrading/configuring a security system. The disclosure has been found to be particularly advantageous for addressing security monitoring applications in which a battery-powered contactless card reader is used to arm/disarm the security system. While the present disclosure is not necessarily so limited, such a security monitoring application is used in the following discussion to exemplify certain embodiments of the present disclosure.

According to various embodiments of the present disclosure, an alarm system is provided having one or more intrusion sensors and a central controller. The central controller includes a control circuit that limits access to changes to a system configuration, which includes adding or changing interface modules (e.g., Wi-Fi modems). This limited access is based on use of an installer code. The central controller also includes a sensor interface circuit that communicates with the intrusion sensor(s) to receive an intrusion event notification. In response to the received intrusion event notification, a remote interface circuit communicates an alarm indication. This remote interface circuit is also included with the central controller. The alarm system also includes a central interface module. The central interface module utilizes a central controller interface circuit to facilitate replacement of the cellular interface module, and to receive the alarm indication from the remote interface. The cellular interface module has a cellular interface circuit that communicates the alarm indication to a remote location over a cellular communications link. An authorization circuit, included in the cellular interface module, requests the installer code from the remote location over the cellular communications link, and in response to receiving the installer code, provides the installer code to the control circuit. In this manner, replacement modules including a verified installer code can be safely and securely installed into alarm systems of the present disclosure.

In order to facilitate insertion and removal of replacement modules, the central controller interface circuit, in certain embodiments, includes a physical connector designed for insertion and removal from the central controller.

Additionally, various embodiments of alarm system of the present disclosure include intrusion sensors having video capturing capabilities. In these instances, the cellular interface circuit is provided with capabilities of transmitting the captured video over the cellular communications link. Further, the video functionalities, both the capturing and communicating, can be influenced by the cellular modem installed in the central controller. For instance, the communication speed of the cellular modem will influence the amount of time the data from a captured video will take to transmit over the cellular communications link. Therefore, a processor contained in the central controller can determine the communication capabilities of the currently connected cellular modem, and adjust the video capturing capabilities (e.g., capture speed, captured image quality, video buffer length, resolution of image, frames per second) of the intrusion sensors. Additionally, alarm systems can have multiple intrusion sensors having video capturing capabilities. Therefore, the use of the multiple video capturing sensors can be toggled to be based on the communication capabilities of the modem. Moreover, in response to the installation of a new or updated cellular modem (providing replacement circuitry corresponding to the interface module), the video capturing capabilities can be readjusted to take into account the communication capabilities of the new or updated cellular modem.

Various aspects of the present disclosure can be shown with reference to the figures. FIG. 1 shows a central controller 100 and various different types of wireless sensors. The central controller 100 includes both wired and cellular aspects so as to communicate with security services and the sensors through a wired connection or a cellular connection. The cellular connection can be provided through, for example, internet wireless or through a different type of cellular communication technology (e.g., 3G, 4G). Further, the central controller 100 communicates with the various different types of sensors. These sensors can include proximity sensors, video sensors, still camera sensors, intrusion sensors, etc.

Figure 2:
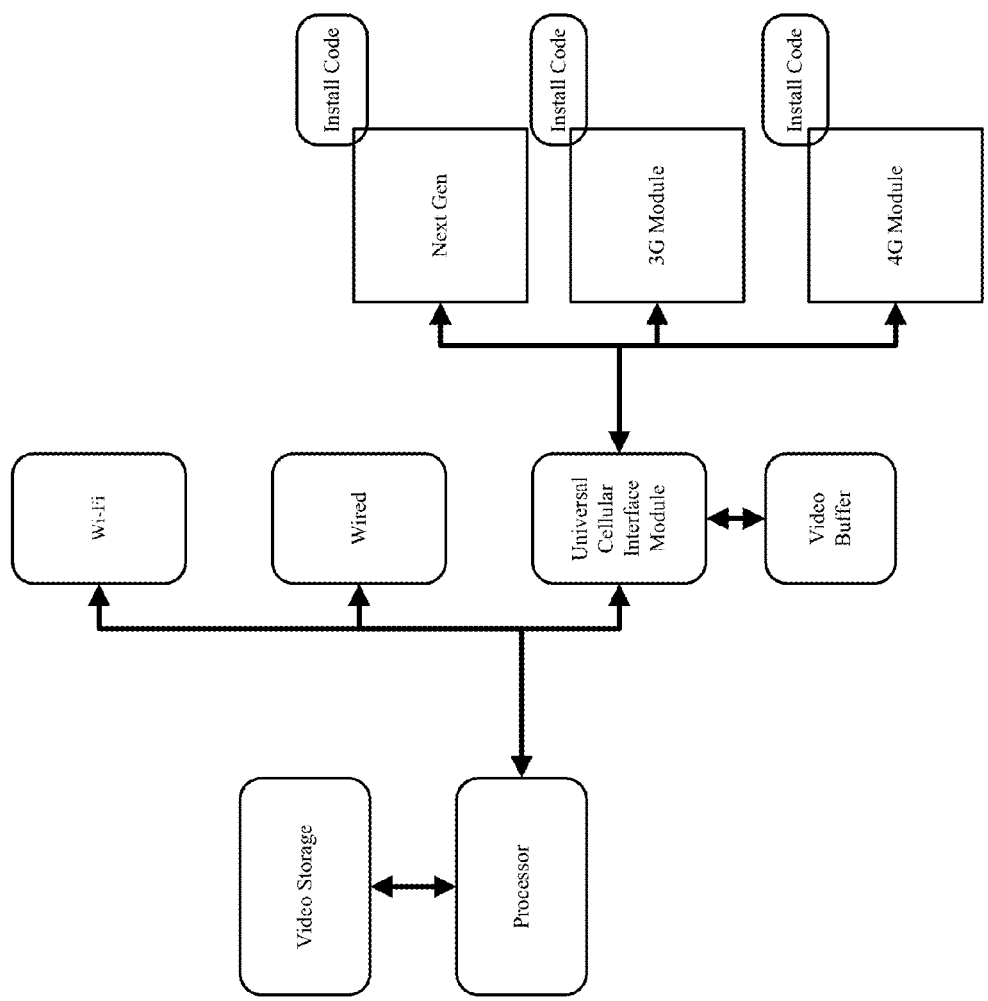
FIG. 2 illustrates an example block diagram of an alarm system including different types of upgradable/configurable communication modules, consistent with various aspects of the present disclosure.

FIG. 2 illustrates a block diagram of an example security system arrangement, consistent with various aspects of the present disclosure. The security system shown in FIG. 2 includes video capabilities that are stored using the video storage. Additionally, the security system includes various communication capabilities, such as Wi-Fi and wired communication. Also shown in FIG. 2 is a universal cellular interface module. In addition to being connected to a video buffer, used to collect video data from the video sensors, the universal cellular interface module is configured to facilitate replacement of cellular interface modules. These different modules (e.g., Next Gen, 3G Module, 4G Module) are shown in FIG. 2, each of which include an install code to facilitate secure connection to the security system arrangement.

Figure 3:
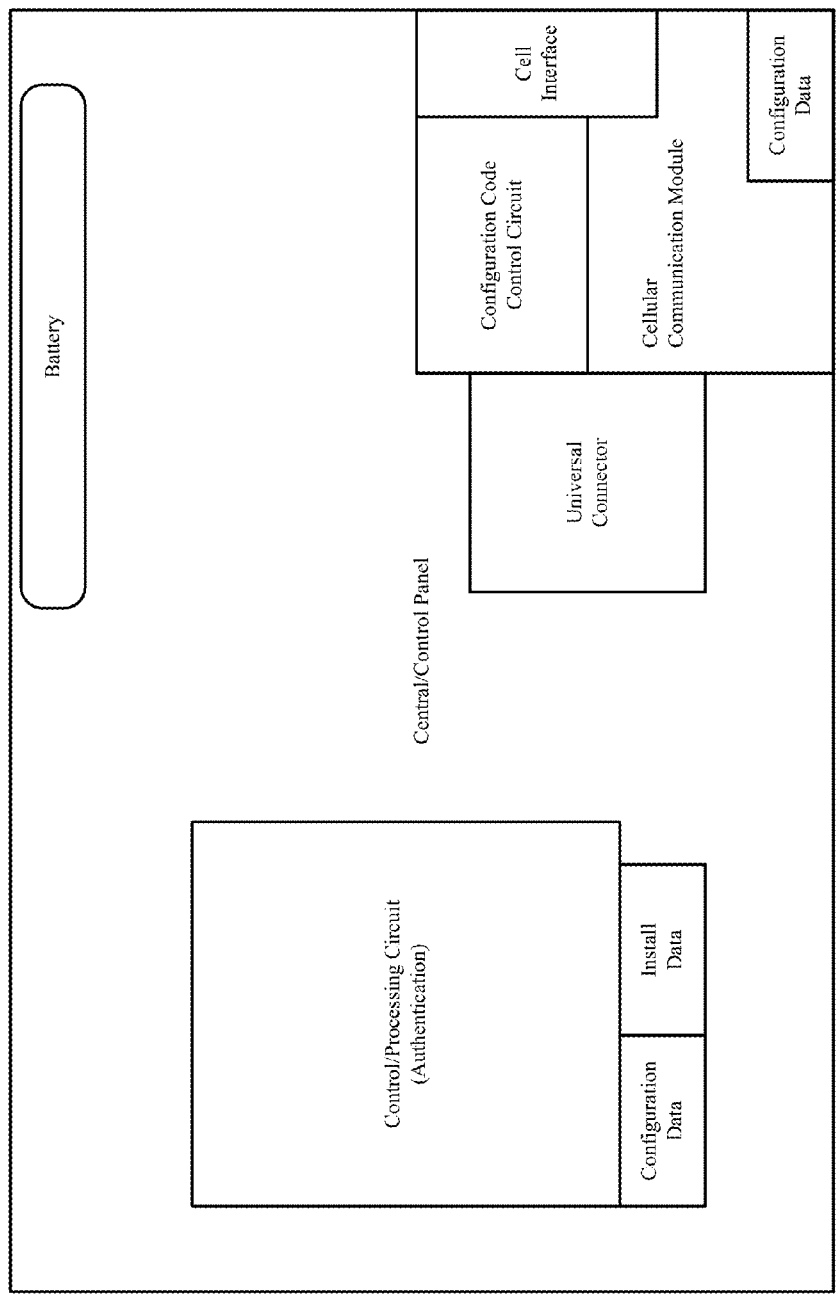
FIG. 3 shows an example block diagram of a central/control panel including an upgradable/configurable communication module, according to an example embodiment of the present disclosure.

FIG. 3 shows a block diagram of a central/control panel, consistent with various embodiments of the present disclosure. The central/control panel shown in FIG. 3 includes a control/processing circuit having configuration data and code data. The central/control panel can also have a battery to continue operation in case of power loss. Also shown in FIG. 3 is a universal connector to facilitate changing of different cellular communication modules. In this manner, the universal connector is connectable to multiple different cellular communication modules.

The cellular communication module to be installed is also shown in FIG. 3, which includes a cellular interface, configuration data (to be communicated with the control/processing circuit), and a configuration code control circuit. The configuration data communicated between the central/control panel and the cellular communication module to be installed allows for the ability to update to the central/control processing circuit of the technical capabilities of the upgraded or new cellular communication module. For instance, the newly installed cellular communication module may have been provided without enough possible bandwidth to transmit and receive video data. A new or upgraded communication module being installed would update the central/control panel for appraisal of these new or upgraded capabilities. Additionally, the to-be-installed (e.g., new or upgraded) communication module may have a faster processor and/or the ability to transmit/receive data at a faster rate than the previous cellular communication module. Therefore, the configuration data of the new or upgraded installed cellular communication module would communicate to the central/control processing circuit to indicate the updated communication capabilities. Accordingly, the central/control processing circuit adapts to, in certain embodiments, changes in data acquisition speed, changes in data transmitting/receiving speed (e.g., to and from the sensors, to and from a remote monitoring system), and/or changes in the quality of the data collected from sensors.

Additionally, the configuration code control circuit included in the cellular communication module, shown in FIG. 3, allows for secure installation of the new or upgraded communication model by requesting an installer code from the remote location over a (e.g., cellular) communications link provided by the cell interface. In response to receiving the installer code, this code is communicated to the control/processing circuit, and verified with the install data that is provided with the control/processing circuit. In this manner, updated/newly installed cellular interface modules are safely and securely installed into alarm systems of the present disclosure.

Figure 4:
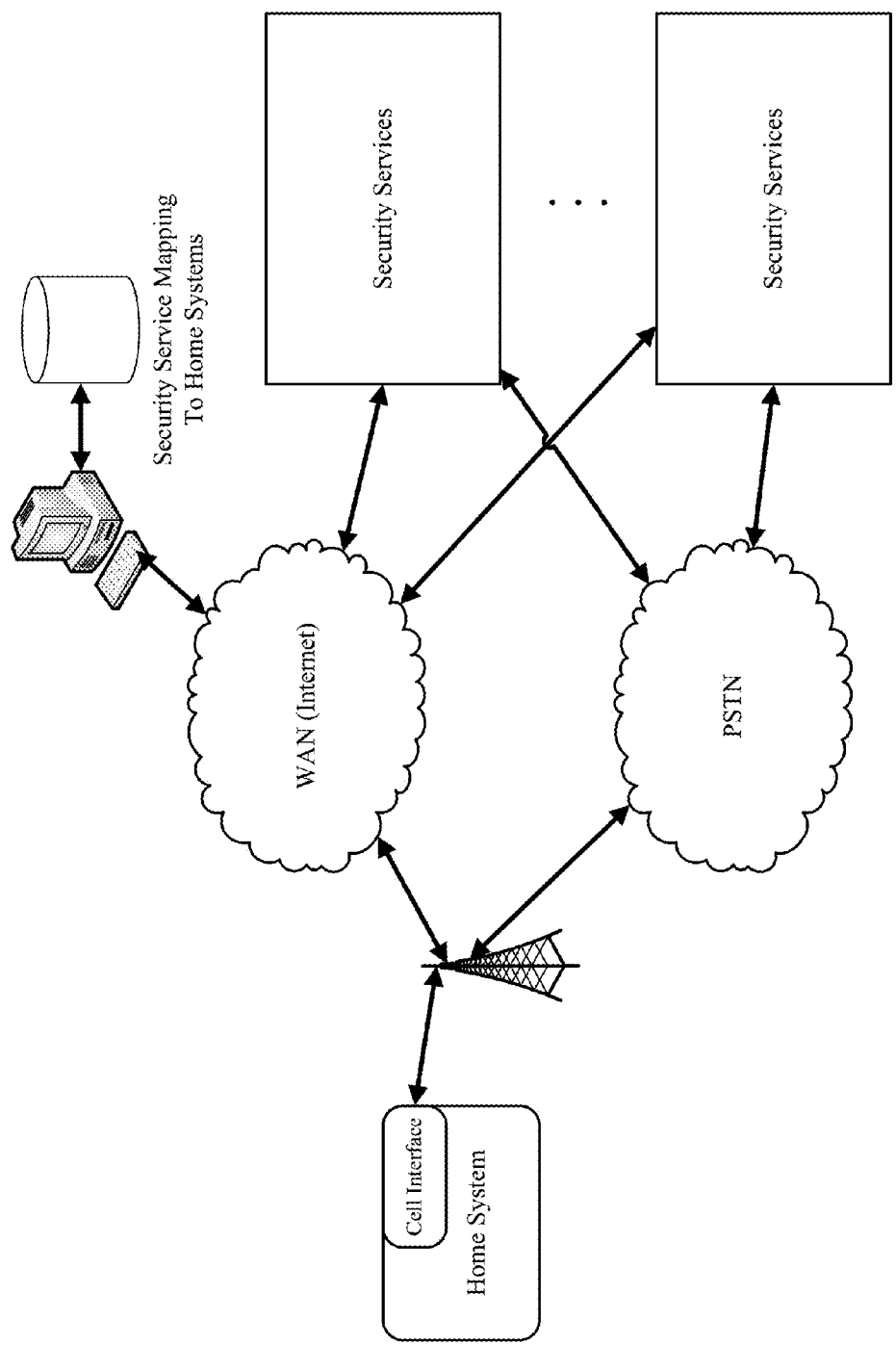
FIG. 4 shows an example communication structure of a security system with security service(s), according to various aspects of the present disclosure.

FIG. 4 shows an example communication structure of a home security system communicating through its cellular interface to one or more security services. The security service(s) monitor various indicators provided by the home system. Additionally, using a cell interface, the security service(s) communicate both using WAN (internet) and/or using Public Switched Telephone Network (PTSN). In this manner, the home security system will be able to communicate with security service(s) in multiple ways to provide for seamless and uninterrupted monitoring of the home security system. Additionally, the home security system has the ability to communicate with a cloud arrangement for security service mapping. In this regard, the data acquired by the home security system can be mapped, using an Internet connection, to a personal computer or wireless to device. This will allow for the owner of the home security system to remotely (live) monitor the activity of the home system. The data acquired by the home system and communicated to the security service mapping can also be saved to a Cloud-type arrangement or on a personal computer or mobile device.

This allows for the owner of the home security system, or an authorized person, to review data (e.g., video) acquired by the system at any time.

Certain aspects of the present disclosure are also directed towards use of a default server addressed stored in firmware. In certain embodiments, the system can communicate with the default server and perform verification. If verification succeeds, contact information is retrieved (e.g. using the internet or phone) for a security service system that is assigned to the particular home security system. If verification fails, an error is provided, and/or the next address in the list (e.g., try a direct cell phone call vs. a web connection) is contacted. Additionally, the security service system can be contacted to obtain necessary installation codes to finalize installation of such a new or upgraded modem.

Additionally, in embodiments of a security system, according to the present disclosure, having video sensors, certain embodiments thereof vary video parameters based upon the upload capabilities of the modem. Capabilities of the modem include, for example: video buffer length; resolution of images; frame collection rate; and the number of simultaneous camera feeds used.

Additionally, in certain embodiments, an additional layer of security is added to the security system by verifying location information based upon local cellular tower locations and signals (e.g., determine approximate location based upon cell tower triangulation and confirm a home security system is supposed to be in that location).

The various circuits and logic described herein can be implemented using a variety of devices including, but not limited to, discrete logic components, analog components, general purpose processors configured to execute software instructions, programmable logic devices and combinations thereof.

Various modules may be implemented to carry out one or more of the operations and activities described herein and/or shown in the Figures. In these contexts, a "module" is a circuit that carries out one or more of these or related operations/activities. For example, in certain aspects of the above-discussed embodiments, one or more modules are discrete logic circuits or programmable logic circuits configured and arranged for implementing these operations/activities, as in the circuit modules shown in the Figures (e.g., FIG. 1, FIG. 2). In certain embodiments, the programmable circuit is one or more computer circuits programmed to execute a set (or sets) of instructions (and/or configuration data). The instructions (and/or configuration data) can be in the form of firmware or software stored in and accessible from a memory (circuit).

Based upon the above discussion and illustrations, those skilled in the art will readily recognize that various modifications and changes may be made to the present disclosure without strictly following the exemplary embodiments and applications illustrated and described herein. For example, the input terminals as shown and discussed may be replaced with terminals of different arrangements, and different types and numbers of input configurations (e.g., involving different types of input circuits and related connectivity). Such modifications do not depart from the true spirit and scope of the present disclosure, including that set forth in the following claims.

What is claimed is:

1. An apparatus comprising:
   one or more intrusion sensors; and
   a central control panel communicatively connected with said one or more intrusion sensors and having:
   a control circuit configured and arranged to limit, based on verification of an installer code, installation of circuitry of interface modules,
   a sensor interface circuit configured and arranged to communicate with the one or more intrusion sensors to receive sensor data,
   a remote interface circuit configured and arranged to communicate, in response to the received sensor data, and
   a communications interface module having:
   a central controller interface circuit configured and arranged to:
   facilitate replacement of the communications interface module and
   to receive the sensor data from the remote interface circuit,
   a wireless interface circuit configured and arranged to communicate the sensor data to a remote location over a communications link, and
   an authorization circuit configured and arranged to:
   request, as part of an installation of a communications interface module into the central control panel, the installer code from the remote location over the communications link, and
   in response to receiving the installer code as requested from the remote location over the communications link, provide the installer code to the control circuit.

2. The apparatus of claim 1, wherein the control circuit is further configured and arranged to alter data acquisition speed between the sensor interface circuit and the one or more intrusion sensors and to alter quality of the sensor data collected from sensors in response to authorized installation of an upgraded communications interface module.

3. The apparatus of claim 1, wherein the one or more intrusion sensors includes a video capture circuit, and, in response to authorized installation of a upgraded communications interface module, the control circuit is further configured and arranged to determine communication capabilities of the video capture circuit.

4. The apparatus of claim 1, wherein the one or more intrusion sensors includes a video capture circuit, and, in response to authorized installation of an upgraded communications interface module, the control circuit is further configured and arranged to determine communication capabilities of the video capture circuit, and the video capturing capabilities includes at least one of capture speed, captured image quality, video buffer length, resolution of image, frames per second.

5. The apparatus of claim 1, wherein the sensor data is indicative of an intrusion event, the remote interface circuit is further configured and arranged to communicate, in response to a received intrusion event notification, an alarm indication, the central controller interface circuit is further configured and arranged to receive the alarm indication from the remote interface circuit, and the communications interface circuit is further configured and arranged to communicate the alarm indication to a remote location over a communications link.

6. An alarm system comprising:
   one or more intrusion sensors; and
   a central control panel having:
   a control circuit configured and arranged to limit, based upon use of an installer code, the installation of circuitry within the control panel by verifying the installer code to finalize installation of a cellular interface module, a sensor interface circuit configured and arranged to communicate with the one or more intrusion sensors to receive sensor data, a remote interface circuit configured and arranged to communicate, in response to the received sensor data, and the cellular interface module, the cellular interface module having:

a central controller interface circuit configured and arranged to facilitate installation of the cellular interface module and to receive the sensor data from the remote interface circuit, a wireless interface circuit configured and arranged to communicate the sensor data to a remote location over a cellular communications link, and an authorization circuit configured and arranged to request the installer code from the remote location over the cellular communications link and in response to receiving the installer code, provide the installer code to the control circuit.

7. The system of claim 6, wherein the control circuit is further configured and arranged to alter data acquisition speed between the sensor interface circuit and the one or more intrusion sensors and to alter quality of the sensor data collected from sensors in response to authorized installation of replacement circuitry corresponding to the interface module.

8. The system of claim 6, wherein the one or more intrusion sensors includes a video capture circuit, and, in response to authorized installation of replacement circuitry corresponding to the cellular interface module, the control circuit is further configured and arranged to determine communication capabilities of the video capture circuit.

9. The system of claim 6, wherein the one or more intrusion sensors includes a video capture circuit, and, in response to authorized installation of replacement circuitry corresponding to the interface module, the control circuit is further configured and arranged to determine communication capabilities of the video capture circuit, and the video capturing capabilities includes at least one of capture speed, captured image quality, video buffer length, resolution of image, frames per second.

10. The system of claim 6, wherein the sensor data is indicative of an intrusion event, the remote interface circuit is further configured and arranged to communicate, in response to a received intrusion event notification, an alarm indication, the central controller interface circuit is further configured and arranged to receive the alarm indication from the remote interface circuit, and the wireless interface circuit is further configured and arranged to communicate the alarm indication to a remote location over a cellular communications link.

11. The system of claim 6, wherein the cellular interface module is further configured and arranged to verify location information based upon local cellular tower locations and signals to confirm an appropriate location of the central controller, and to prompt the authorization circuit to request the installer code from the remote location.

12. The system of claim 6, wherein the one or more intrusion sensors includes a video capture circuit and the wireless interface circuit is configured and arranged to transmit video from the video capture circuit over the cellular communications link.

13. The system of claim 6, wherein the control circuit is further configured and arranged to alter data acquisition speed between the sensor interface circuit and the one or more intrusion sensors in response to authorized installation of replacement circuitry corresponding to the cellular interface module.

14. The system of claim 6, wherein the control circuit is further configured and arranged to alter quality of the sensor data collected from sensors in response to authorized installation of replacement circuitry corresponding to the cellular interface module.

15. The system of claim 6, wherein the central controller interface circuit includes a physical connector designed for insertion and removal from the central controller.

16. The system of claim 6, wherein the wireless interface circuit is further configured and arranged to communicate the sensor data to a remote location over a cellular communications link via at least one of a cell interface, Internet, and Public Switched Telephone Network (PTSN).

* * * * *